United States Patent [19]

Hatke et al.

[11] Patent Number: 6,008,298
[45] Date of Patent: Dec. 28, 1999

[54] MODIFIED CYCLOOLEFIN COPOLYMER

[75] Inventors: Wilfried Hatke, Hofheim; Frank Osan, Kelkheim; Otto Herrmann-Schönherr, Bensheim, all of Germany

[73] Assignees: Hoechst Aktiengesellschaft; Mitsui Petrochemical Ind., Ltd., both of Germany

[21] Appl. No.: 09/010,871

[22] Filed: Jan. 22, 1998

Related U.S. Application Data

[63] Continuation of application No. 08/808,668, Feb. 28, 1997, abandoned.

[51] Int. Cl.$^6$ ................................................ C08L 45/00
[52] U.S. Cl. .......................... 525/210; 525/75; 525/84; 525/216
[58] Field of Search .................................. 525/210, 216, 525/84, 75

[56] References Cited

U.S. PATENT DOCUMENTS

| | | | |
|---|---|---|---|
| 4,104,325 | 8/1978 | Ueshima et al. | |
| 5,094,806 | 3/1992 | Laughner et al. | 525/211 |
| 5,274,032 | 12/1993 | Eichenauer et al. | 525/64 |
| 5,304,606 | 4/1994 | Yamamoto | 525/210 |
| 5,324,801 | 6/1994 | Brekner et al. | 526/160 |

FOREIGN PATENT DOCUMENTS

| | | |
|---|---|---|
| 0 485 631 | 5/1992 | European Pat. Off. . |
| 27 31 445 | 2/1978 | Germany . |
| 42 02 108 | 7/1993 | Germany . |

OTHER PUBLICATIONS

Koinzer, "Mixture Containing Norbornene–Ethylene Copolymers", Chem. Abstracts (88:137463q).

*Primary Examiner*—Fred Zitomer
*Attorney, Agent, or Firm*—Connolly & Hutz

[57] ABSTRACT

Polymer alloy comprising a) one or more cycloolefin copolymers and b) one or more types of core/shell particles having a diameter of 0.01 to 0.7 micrometer.

20 Claims, No Drawings

MODIFIED CYCLOOLEFIN COPOLYMER

This application is a continuation of application Ser. No. 08/808,668, Feb. 28, 1997, now abandoned.

The present invention relates to polymer alloys of cycloolefin copolymers (COC) and core/shell particles. Compared with the pure COC, these polymer alloys (mixtures) are distinguished above all by an improved elongation at break, flexural strength and impact strength.

Thermoplastic cycloolefin copolymers are sufficiently described in the literature (EP 203 799, EP 283 164, EP 407 870, EP 485 893, EP 503 422, EP 610 815, EP 610 816, DD 222 317, DD 231 070, DD 246 903, EP 156 464). They are distinguished by a number of technologically important properties, such as low absorption of water, high heat distortion temperature, high elasticity moduli and hydrolytic resistance.

COC are thus in principle suitable for technical applications. However, COC are as a rule brittle and have only a low impact strength, flexural strength and elongation at break, which severely restricts their possible uses.

It is known that the impact strength and the elongation at break of polymers can be improved by alloying. However, since the mechanical properties of impact-resistant polymer alloys are not composed additively of the properties of the individual components, impact modification of polymers is a largely empirical task, achievement of which requires still further research and development (C. B. Bucknall in Comprehensive Polymer Science, Pergamon Press, 1989, page 34).

The impact strength of brittle polymers can be improved by alloying with polymer systems which are built up completely or partly from rubbers having low glass transition temperatures C. B. Bucknall, Toughened Plastics, Applied Science Publishers, London 1977, chapter 4).

So-called core/shell particles are also suitable for impact modification (Res. Discl. 323, pages 925–926; DE 4040986, EP 390 144, EP 390 146, EP 4005172, DE 3842796, EP 411 822, DE 3704657, EP 127 407) and are known as impact modifiers of, for example, PVC or PMMA (Gächter/Müller Kunstatoff-Additive (Plastics Additives) XXIX; Carl Hanser, Munich, 1983 and C. B. Bucknall, Rubber-modified Plastics, Comprehensive Polymer Science, Pergamon Press (1989) page 27–49). The impact-modifying action of the core/shell particles depends on a large number of different parameters, such as particle size, phase adhesion to the matrix polymer, or modulus.

A prerequisite for achieving adequate impact strengths is good phase adhesion or miscibility between the matrix polymer and the core/shell particle (D. R. Paul in Encyclopedia of Polymer Science, Volume 12 (1984) page 437; A. E. Platt in Comprehensive Polymer Science, Pergamon Press N.Y. (1989) page 437), M. Lu et al., Polymer, 34 (1993) page 1874, M. E. Fowler et al. Polymer 1987, 28, 1703).

Like all polyolefins, COC are also poorly miscible with other polymers and therefore show poor phase adhesion to other polymers. The compatibility and therefore the phase adhesion of polymers can be estimated, for example, by the solubility parameter delta according to D. W. van Krevelen (Properties of Polymers Elsevier, Amsterdam-Oxford-New York, 1976, chapter 7). In this estimation, values of about 13.5 $J^{1/2}cm^{3/2}$ are obtained for COC. These values are significantly below those of typical impact-modifiable polymers.

For impact modification of COC, it has thus been necessary to date to crosslink these with the rubber-containing polymer (JP 92-170453, JP 92-170454, JP 92-356353). In order to guarantee good phase adhesion. However, the morphologies and degrees of crosslinking and the associated impact strength and rheological properties can be established reliably and reproducibly by this procedure only with difficulty. In particular, the reproducibility of the properties mentioned depends sensitively on parameters such as, for example, processing conditions, crosslinking agent content, temperature and time.

It is furthermore known that the optimum particle size d (in micrometers) of core/shell particles for impact modification of a brittle polymer depends on the entanglement density ne of the brittle polymer in accordance with the following relationship (S. Wu, Polymer International, 29 (1992) pages 229–247): $\log(d) = 1.19 - 14.1\, n_e$. Experimental results confirm the validity of this relationship (Polym. Eng. Sci. 31 (1991) 213; J. Appl. Polym. Sci. 48 (1993) 75). It is furthermore known that, already for particle diameters just below the optimum particle diameter, an impact-modifying action no longer occurs (J. Appl. Polym. Sci. 48 (1993) 75).

If the optimum particle diameter for impact modification of COC is determined from the relationship given by S. Wu, the core/shell particles should have diameters of between 1 and 3 micrometers. However, according to the current prior art, such particles can be realized industrially only with difficulty.

The object was thus to improve the impact strength of COC and thereby to avoid the disadvantages of the prior art.

It has been found, surprisingly, that polymer alloys (mixtures) of COC with core/shell particles having a diameter of less than 0.7 micrometer show the desired profile of properties.

The present invention thus relates to a polymer alloy which comprises a) one or more cycloolefin copolymers and b) one or more types of core/shell particles having a diameter of 0.01 to 0.7 micrometer.

The alloy according to the invention preferably comprises one COC and one or more types of core/shell particles, particularly preferably one COC and one type of core/shell particles.

The alloy according to the invention preferably comprises COC which comprise 0.1–99% by weight of structural units, based on the total weight of the COC, which are derived from one or more polycyclic olefins, preferably of the formulae I, II, III, IV, V or VI,

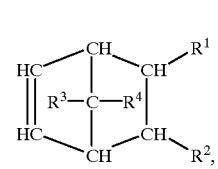
(I)

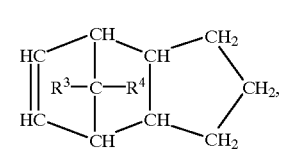
(II)

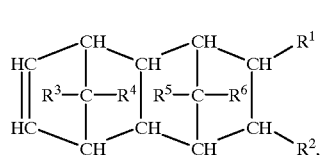
(III)

-continued

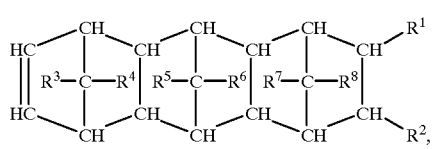
(IV)

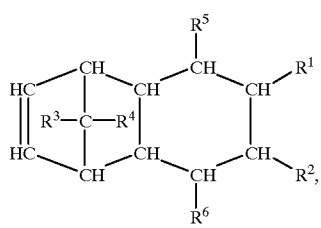
(V)

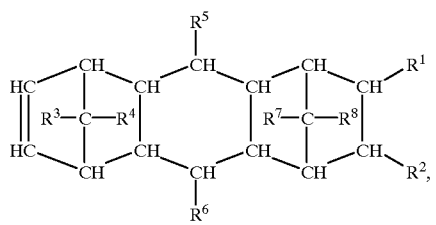
(VI)

in which $R^1$, $R^2$, $R^3$, $R^4$, $R^5$, $R^6$, $R^7$ and $R^8$ are identical or different and are a hydrogen atom or a $C_1/C_{20}$ hydrocarbon radical such as a linear or branched $C_1$–$C_8$-alkyl radical, a $C_6$–$C_8$-aryl radical, a $C_7$–$C_{20}$-alkylenearyl radical or a cyclic or acyclic $C_2$–$C_{10}$-alkenyl radical, or two or more radicals $R^1$–$R^8$ form a ring, and the radicals $R^1$–$R^8$ in the various formulae I–IV can have a different meaning, 0 to 95% by weight of structural units, based on the total weight of the COC, which are derived from one or more monocyclic olefins, preferably of the formula VII

(VII)

in which n is a number from 2 to 10, and 0 to 99% by weight of structural units, based on the total weight of the COC, which are derived from one or more acyclic olefins, preferably of the formula VIII

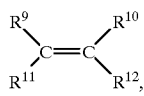
(VIII)

in which $R^9$, $R^{10}$, $R^{11}$ and $R^{12}$ are identical or different and are a hydrogen atom or a $C_1$–$C_{20}$ hydrocarbon radical such as $C_1$–$C_8$-alkyl radical or $C_6$–$C_{14}$-aryl radical.

The cycloolefin copolymers preferably comprise structural units which are derived from one or more cyclicolefins, particularly preferably polycyclic olefins of the formulae I or III, and one or more acyclic olefins of the formula VIII, in particular α-olefins having 2–20 carbon atoms. Cycloolefin copolymers which comprise structural units which are derived from a polycyclic olefin of the formula I or III and an acyclic olefin of the formula VIII are particularly preferred.

Preferred COC are those which comprise structural units which are derived from polycyclic olefins having a norbornene base structure, particularly preferably norbornene or tetracyclododecene. Preferred COC are also those which comprise structural units which are derived from acyclic olefins having terminal double bonds, such as α-olefins having 2–20 carbon atoms, particularly preferably ethylene or propylene. Norbornene/ethylene and tetracyclododecene/ethylene copolymers are particularly preferred. The content of acyclic olefins of the formula VIII is 0 to 99% by weight, preferably 5–80% by weight, particularly preferably 10–60% by weight, based on the total weight of the COC.

The COC are prepared at temperatures of −78 to 150° C. under a pressure of 0.01 to 64 bar, in the presence of one or more catalysts which comprise a transition metal compound and, if appropriate, a cocatalyst. Suitable transition metal compounds are metallocenes, especially stereorigid metallocenes, and compounds based on titanium and vanadium. Examples of catalyst systems appropriate to the preparation of the COC suitable for the purposes of the invention are described, for example, in EP 203 799, EP 283 164, EP 407 870, EP 485 893, EP 503 422, DD 777 317, DD 231 070.

Examples of transition metal compounds employed are:
rac-dimethylsilyl-bis-(1-indenyl)-zirconium dichloride,
rac-dimethylgermyl-bis-(1-indenyl)-zirconium dichloride,
rac-phenylmethylsilyl-bis-(1-indenyl)-zirconium dichloride,
rac-phenylvinylsilyl-bis-(1-indenyl)-zirconium dichloride,
1-silacyclobutyl-bis-(1-indenyl)-zirconium dichloride,
rac-diphenylsilyl-bis-(1indenyl)-hafnium dichloride,
rac-phenylmethylsilyl-bis-(1-indenyl)-hafnium dichloride,
rac-diphenylsilyl-bis-(1-indenyl)-zirconium dichloride,
rac-ethylene-1,2-bis-(1-indenyl)-zirconium dichloride,
dimethylsilyl-(9-fluorenyl)-(cyclopentadienyl)-zirconium dichloride,
diphenylsilyl-(9-fluorenyl)-(cyclopentadienyl)-zirconium dichloride,
bis-(1-indenyl)-zirconium dichloride,
diphenylmethylene-(9-fluorenyl)-cyclopentadienyl zirconium dichloride,
isopropylene-(9-fluorenyl)-cyclopentadienyl-zirconium dichloride,
phenylmethylmethylene-(9-fluorenyl)-cyclopentadienyl-zirconium dichloride,
isopropylene-(9-fluorenyl)-(1-(3-isopropyl)cyclopentadienyl)-zirconium dichloride,
isopropylene-(9-fluorenyl)(1-(3-methyl)cyclopentadienyl)-zirconium dichloride,
diphenylmethylene-(9-fluorenyl)(1-(3-methyl)cyclopentadienyl)-zirconium dichloride,
methylphenylmethylene-(9-fluorenyl)(1-(3-methyl)cyclopentadienyl)-zirconium dichloride,
dimethylsilyl-(9-fluorenyl)(1-(3-methyl)cyclopentadienyl)-zirconium dichloride,
diphenylsilyl-(9-fluorenyl)(1-(3-methyl)cyclopentadienyl)-zirconium dichloride,
diphenylmethylene-(9-fluorenyl)(1-(3-tert-butyl)cyclopentadienyl)-zirconium dichloride,
isopropylene-(9-fluorenyl)(1-(3-tert-butyl)cyclopentadienyl)-zirconium dichloride,
isopropylene-(cyclopentadienyl)-(1-indenyl)-zirconium dichloride,
diphenylcarbonyl-(cyclopentadienyl)-(1-indenyl)-zirconium dichloride,
dimethylsilyl-(cyclopentadienyl)-(1-indenyl)-zirconium dichloride,
isopropylene-(methylcyclopentadienyl)-(1-indenyl)-zirconium dichloride and analogous hafnocenes,
titanium tetrachloride, $VOCl_3$, $VOCl_2(OCH_3)$, $VOCl_2(OC_2H_5)$ and $VOCl(OC_2H_5)_2$.

Preferred compounds here are:
rac-dimethylsilyl-bis-(1-indenyl)-zirconium dichloride,
rac-phenylmethylsilyl-bis-(1-indenyl)-zirconium dichloride,
rac-phenylvinylsilyl-bis-(1-indenyl)-zirconium dichloride,
rac-diphenylsilyl-bis-(1-indenyl)-zirconium dichloride,
rac-ethylene-1,2-bis-(1-indenyl)-zirconium dichloride,
isopropylene-(cyclopentadienyl)-(1-indenyl)-zirconium dichloride,
diphenylcarbonyl-(cyclopentadienyl)-(1-indenyl)-zirconium dichloride,
dimethylsilyl-(cyclopentadienyl)-(1-indenyl)-zirconium dichloride,
isopropylene-(methylcyclopentadienyl)-(1-indenyl)-zirconium dichloride.

The COC suitable for the purposes of the invention have glass transition temperatures of between 50 and 250° C., preferably between 100 and 200° C., particularly preferably between 100 and 150° C.

The COC suitable for the purposes of the invention have viscosity numbers (determined in Decalin at 135° C.) of between 25 and 200 ml/g, preferably between 40 and 120 ml/g, particularly preferably between 40 and 80 ml/g.

The core/shell particles contained in the alloy according to the invention comprise two (core and one shell) or more (core and a plurality of shells) layers of different polymers alternating with one another. A common feature of these particles is that the individual layers comprise polymers having different glass transition temperatures $T_g$. Polymers having a low glass transition temperature are called the rubber phase here, and polymers having a high glass transition temperature are called the hard phase. Such particles can be prepared, for example, by emulsion polymerization. One or more layers can be crosslinked chemically during the preparation, so that the shape and size of the core/shell particle does not change during subsequent alloying with COC.

The core/shell particles suitable for the purposes of the invention have average total diameters of 0.01 to 0.7 micrometer, preferably 0.02 to 0.4 micrometer, particularly preferably 0.05 to 0.3 micrometer.

Suitable non-crosslinked base materials for the crosslinked rubber phases are polymer systems which have glass transition temperatures below 0° C., preferably below −20° C. and particularly preferably below −40° C. All polymers which have such glass transition temperatures and are suitable for synthesis of core/shell particles are in principle suitable.

Core/shell particles, the rubber phases of which have particularly low glass transition temperatures $T_g$, are particularly suitable for the preparation of polymer alloys which are employed for applications at low temperatures.

The glass transition temperatures of the rubber phases often cannot be measured by themselves, but can be determined by preparing an emulsion polymer of the monomer composition in question, isolating this polymer and determining its glass transition temperature. Another method for determination of the glass transition temperatures of the rubber phases comprises measurement of dynamic mechanical properties of the polymer alloys according to the invention and of those of the matrix polymers by themselves. Maxima in the loss factor curves can be regarded as a measure of the glass transition temperatures.

The core/shell particles which are suitable for the purposes of the invention comprise rubber phases in % by volume, based on the total volume of the particles, of between 10 and 90, preferably between 20 and 70 and particularly preferably between 30 and 60.

The core/shell particles which are suitable for the purposes of the invention comprise hard phases in % by volume, based on the total volume of the particles, of between 90 and 10, preferably between 80 and 30 and particularly preferably between 70 and 40.

The preparation of core/shell particles is well-known and is described in detail, for example, in U.S. Pat. Nos. 3,833,682, 3,787,522, DE 2 116 653, DE 22 53 689, DE 41 32 497, DE 41 31 738, DE 40 40 986, U.S. Pat. No. 3,251,904, DE 33 00 526.

Homo- or copolymers comprising two or more monomer types can be used as the rubber phase of the core/shell particles. A common feature of these homo- and copolymers is a glass transition temperature below 0° C.

The homo- and copolymers here can be derived from the following monomers:
  conjugated diene monomers, such as butadiene, isoprene and chloroprene, and monoethylenically unsaturated monomers, such as alkyl and aryl acrylates, in which the alkyl radicals can be linear, cyclic or branched and the aryl radicals in turn can themselves be substituted,
  alkyl and aryl methacrylates, in which the alkyl radicals can be linear, cyclic or branched and the aryl radicals in turn can themselves be substituted,
  substituted alkyl and aryl methacrylates and acrylates, in which the substituents can be linear, cyclic or branched alkyl radicals or substituted aryl radicals,
  acrylonitriles and substituted acrylonitriles (for example methacrylonitrile, alpha-methyleneglutaronitrile, alpha-ethylacrylonitrile, alpha-phenylacrylonitrile), alkyl- and arylacrylamides and substituted alkyl- and arylacrylamides, vinyl esters and substituted vinyl esters, vinyl ethers and substituted vinyl ethers, vinylamides and substituted vinylamides, vinyl ketones and substituted vinyl ketones, vinyl halides and substituted vinyl halides, olefins having one or more unsaturated double bonds, such as are used, for example, for the preparation of olefinic rubbers, in particular ethylene, propylene, butylene and 1,4-hexadiene, and vinyl-aromatic compounds, such as styrene, alpha-methylstyrene, vinyltoluene, halostyrenes and t-butylstyrene.

Rubber phases based on organopolysiloxanes of the following formula can likewise be used for building up core/shell particles

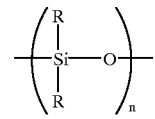

in which R is identical or different alkyl or alkenyl radicals having 1 to 10 carbon atoms, aryl radicals or substituted hydrocarbon radicals. The alkyl radicals and alkenyl radicals here can be linear, branched or cyclic.

Furthermore, rubber phases based on fluorinated monoethylenically unsaturated compounds such as tetrafluoroethylene, vinylidene fluoride, hexafluoropropene, chlorotrifluoroethylene and perfluoro(alkyl vinyl ethers) can be used.

The rubber phases can also be crosslinked, for which polyfunctional unsaturated compounds such as are described, for example, in DE 2 116 653, U.S. Pat. No. 3,787,522 and EP 0 436 080 can be used. The use of grafted-on monomers is also described in these publications. These compounds are employed in order to bind a possible further shell chemically to the phase underneath, if this is desired.

Core/shell particles in which the rubber phases are based on butadiene are preferred for achieving polymer alloys having a good impact strength even at low temperatures.

Core/shell particles in which the rubber phases are based on acrylic acid esters are preferred for achieving polymer alloys having a good stability to weathering.

Core/shell particles in which the rubber phases are based on organosiloxanes are preferred if the polymer alloys are to combine good impact strength at low temperatures, good stability to weathering and good stability during preparation and processing from the melt with one another.

Homo- and copolymers can be used for the hard phases of the core/shell particles according to the invention. The copolymers here can be built up from two or more monomers. A common feature of the corresponding homo- and copolymers is a glass stage above 50° 20 C. The homo- and copolymers here can be derived from the following monomers:

Monoethylenically unsaturated compounds, such as alkyl and aryl acrylates, in which the alkyl radicals can be linear, cyclic or branched and the aryl radicals in turn can themselves be substituted, alkyl and aryl methacrylates, in which the alkyl radicals can be linear, cyclic or branched and the aryl radicals in turn can themselves be substituted, substituted alkyl and aryl methacrylates and acrylates, in which the substituents can be linear, cyclic or branched alkyl radicals or substituted aryl radicals, acrylonitriles and substituted acrylonitriles (for example methacrylonitrile, alpha-methyleneglutaronitrile, alpha-ethylacrylonitrile, alpha-phenylacrylonitrile and the like), alkyl- and arylacrylamides, vinyl esters and substituted vinyl esters, vinyl ethers and substituted vinyl ethers, vinylamides and substituted vinylamides, vinyl ketones and substituted vinyl ketones, vinyl halides and substituted vinyl halides, olefins (for example ethylene, propylene, butylene), cyclic olefins (for example norbornene, tetracyclododecene, 2-vinylnorbornene), fluorinated monoethylenically unsaturated compounds such as tetrafluoroethylene, vinylidene fluoride, hexafluoropropene, chlorotrifluoroethylene and perfluoro(alkylvinyl ether), and vinylaromatic compounds of the formula:

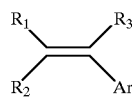

in which $R_1$, $R_2$ and $R_3$ are hydrogen, linear, branched or cyclic alkyl radicals or substituted or unsubstituted aryl radicals, which can be identical or different, and Ar is an aromatic $C_6$–$C_{18}$-radical, which can additionally also carry substituents, such as alkyl radicals or halogen radicals.

The hard phases can be crosslinked, for which polyfunctional unsaturated compounds such as are described, for example, in DE 2 116 653, U.S. Pat. No. 3,787,522 and EP 0436 080 are suitable. The use of grafted-on monomers is also described in these publications. These compounds are employed in order to bind a possible further shell chemically to the phase underneath, if this is desired.

Possible non-crosslinked base materials for the hard phases are all polymers having glass transition temperatures above 50° C., preferably above 80° C. and particularly preferably above 100° C.

The alloy according to the invention can also comprise commercially obtainable core/shell particles, for example Staphyloid types from TAKEDA Chem. Industries, such as, for example, those described in JP 17514 or JP 129266, Kane-Ace types from KANEKA, which are described, for example, in the product brochure Kane ACE-B, Metablen C, Metablen W and Metablen E types from METABLEN Company BV, which are described in the product brochure Metablen, Blendex types from GE PLASTICS or Paraloid types from ROHM and HAAS, which are described, for example, in Gächter/Müller Kunststoff-Additive (Plastics Additives), Carl Hanser Munich (1983) page XXIX et seq. or the brochure PARALOID BTA 733, Impact Modifier for Clear Packaging (1987) from Rohm and Haas or the brochure PARALOID BTA-III N2 BTA-702 BTA 715 (1989) from Rohm and Haas.

The polymer alloys according to the invention comprise 2 to 50% by weight, preferably 10 to 40% by weight and particularly preferably 10 to 25% by weight, of core/shell particles, based on the total alloy.

Core/shell particles having average refractive indices (volume mean) of between 1.52 and 1.55, preferably between 1.53 and 1.54, are suitable for achieving the highest possible transparency of the polymer alloys. The particular choice of optimum particle refractive indices and radii ratios of the particles can be determined in accordance with Makromol. Chem. 183 (1990) 221 for particles of one core and one shell, or in accordance with M. Kerker, The Scattering of Light, Academic Press (1969) chapter 5.4 for multishell particles. Core/shell modifiers having a multilayer structure which comprise a core and several shells in particular are especially suitable for obtaining transparent impact-resistant polymer alloys.

The polymer alloys according to the invention are prepared at temperatures above the glass transition temperature of the COC of between 60 and 350° C., preferably between 100 and 150° C. and particularly preferably between 110 and 130° C.

The polymer alloys according to the invention can be prepared by customary processes (D. D. Walsh, Comprehensive Polymer Science, Pergamon Press (1989), chapter 5.2; J. L. White and K. Min, Comprehensive Polymer Science, Pergamon Press, (1989), page 285 et seq.). In particular, the components can be processed in the form of powders or granules, by extrusion together from the melt, to give granules or chips, which can then be converted into shaped structures, for example by pressing, extrusion or injection molding. The alloy according to the invention is particularly suitable for production of injection-molded, injection blow-molded, extrusion blow-molded or extruded shaped articles. Furthermore, films and fibers can also be produced from the polymer alloy according to the invention.

The polymer-polymer alloys according to the invention can be prepared, in particular, via so-called masterbatches. In this process, core/shell particles are mixed in amounts of 20 to 80% by weight, based on the total weight of the alloy, with one or more COC (preferably by extrusion together) and the mixture is then brought to the desired final concentration by renewed mixing (preferably by extrusion together) with one or more COC. This method leads to good dispersion of the core/shell particles and is preferably used if polymer alloys having contents of 3 to 25% by weight of core/ shell particles, based on the total weight of the alloy, are prepared.

The polymer alloy according to the invention has elongations at break of 4 to 200%, preferably 5 to 100%, particularly preferably 10 to 30%, and notched impact strengths of 2.5 to 100 $KJ/m^2$, preferably 4 to 50 $KJ/m^2$, particularly preferably 10 to 30 $KJ/m^2$. It is preferably transparent and has clouding values (measured as haze in % in accordance with ASTM D 1003-61) of 2–80%, preferably 2 to 50%, particularly preferably 2 to 25%.

The polymer alloy according to the invention can comprise additives in the customary amounts, such as, for example, plasticizing agents, UV stabilizers, optical brighteners, antioxidants, antistatics, heat stabilizers or reinforcing additives, such as glass fibers, carbon fibers or high modulus fibers, such as polyaramids or liquid crystal polyesters or the like. They can furthermore comprise fillers, such as inorganic materials, talc, titanium dioxide or the like.

The polymer alloy according to the invention is suitable for a multiplicity of applications, such as containers, bottles, drinking cups, medical applications, such as blister packs or injection-molded components for anesthesia, respiration, pediatrics or medical supply equipment, domestic goods, such as cutlery, microwave utensils, freezer containers, bowls, tubs, in particular bathtubs, clothes-pins, toilet seats, water taps, furniture, suitcases, in particular shell-type suitcases, flowerpots, lids and closures for bottles, toys, such as building blocks or pedal cars, extruded film, for example for packaging, capacitor applications, covering tarpaulins, building applications, such as window profiles, panels, folding doors, blinds and flooring, aviation applications, such as aircraft interior fittings, fibers for textiles, housings of electrical equipment, such as printers, display screens, keyboards, computers, telephones and hifi equipment, lamp housings, impact drilling machines, belt grinders, vibrating grinders, circular saws, applications at low temperatures, such as refrigerator inserts or freezer cabinet components, cable sheathings, pipes, sports equipment, such as protective helmets, boat hulls and surfboards, interior fittings of automobiles, such as linings or dashboards, exterior fittings on automobiles, such as bumpers, opaque planking or hub caps, semi-finished products, such as seals, pipe connectors or cable connectors, optical applications, such as diffusing disks, lenses, rupture disks and inspection glasses, syringes, covers for solar collectors, watchglasses, diving glasses, CD boxes, cassette boxes, headlamp covers, substrates for LCD displays, films for laminated panes, optical disks, optical waveguides, transparent toys, self-adhesive films, office material, such as transparent covers, plotter films or diskette boxes, shower cubicles, spectacle frames, roofing-in sheets, such as double-webbed sheets, transparent screwdriver handles, vizors and furniture, such as tables and chairs.

The polymer alloy according to the invention has a high flexural strength and a high stress cracking resistance as well as a good melt stability. It shows a good weld strength and good flow properties, which is of particular advantage for injection molding applications. The mechanical properties, such as, for example, heat distortion stability, elongation at break and notched impact strength, can be varied within wide ranges, so that many fields of application are accessible. Furthermore, the alloy can be transparent. The alloy according to the invention can be prepared without it being necessary to carry out optimization of the core/shell particles for the COC in expensive tests. Furthermore, processing of the alloy is easy to carry out industrially.

EXAMPLES

The cycloolefin copolymers and core/shell particles were first dried (90° C., 24 h, reduced pressure) and then extruded together under an inert gas (argon) in various weight ratios in an extruder (Haake, Rheocord System 90/Rheomex TW 100, Karlsruhe, Germany). The polymer alloys, which were obtained in the form of granules, were dried again as described above and then injection-molded under an inert gas (argon) to give tensile specimens, impact specimens and sheets. A KM 90-210 B injection molding machine from Krauss-Maffei, Munich, Germany was used. The physical properties of the cycloolefin copolymers and polymer alloys thereof were characterized as follows.

Glass transition temperatures were determined using a differential scanning calorimeter DSC 7 from Perkin Elmer, Überlingen, Germany. The heating rate was 20° C./min.

A tensile stress/elongation machine 4302 from Instron, Offenbach, Germany was employed for determination of mechanical properties such as elasticity moduli, elongations at break and tensile strength according to DIN 53455 (tensile stress/elongation properties).

Notched impact strengths were measured by means of a hammer pendulum 5102, with instruments, from Zwick, Ulm, Germany according to DIN 53453.

Melt viscosities were determined using a rheometer RDS from Rheometrics, Piscataway, N.J., USA.

Viscosity numbers of the COC used were determined according to DIN 53728 (decahydronaphthalene, 135° C.).

3-point bending tests were carried out on injection-molded test specimens according to DIN 53452/53457.

Optical properties such as clouding, total light transmission and diffuse transmission were determined on injection-molded sheets 2 mm thick according to ASTM D 1003.

The following core/shell particles commercially obtainable from Rohm and Haas (Frankfurt, Germany) were used: Paraloid EXL 3647® (particle diameter: 0.3 micrometer), Paraloid EXL 2600® (particle diameter: 0.1 micrometer) and KANE ACE B 582® from Kaneka (particle diameter: 0.1 micrometer).

Polymerizations

Example 1

A clean and dry 75 dm$^3$ polymerization reactor with a stirrer was flushed with nitrogen and then with ethylene and filled with 12 kg of norbornene and 15 dm$^3$ of toluene. 300 ml of triisobutylaluminum solution (20% w/w in toluene) were added. The ethylene pressure was adjusted to an increased pressure of 18 bar. The reaction temperature was adjusted to 70° C. 20 mg of isopropenyl(cyclopentadienyl) (1-indenyl)-zirconium dichloride were dissolved in 500 ml of a toluene solution of methylaluminoxane (10% by weight of methylaluminoxane of molecular weight 1300 g/mol according to cryoscopic determination) and the solution was then metered into the reactor. The ethylene pressure was kept at 18 bar by topping up. After a polymerization time of 90 minutes, the contents of the reactor were emptied into a 150 dm$^3$ stirred tank into which 500 g of Celite and 200 ml of water in 50 dm$^3$ of a hydrogenated diesel oil fraction (Exxsol, boiling range 100 to 120° C. from Exxon) had been initially introduced. The mixture was stirred at 60° C. for 20 minutes. A filter cake of 500 g of Celite suspended in 10 dm$^3$ of Exxsol was built up on the filter fabric of a 120 dm$^3$ pressure suction filter. The polymer solution was filtered over the pressure suction filter. A nitrogen pressure of 2.8 bar was built up over the solution. The mixture was then filtered over seven filter candles (Fluid Dynamics, Dynalloy XS 64.5 µm 0.1 m²/candle), which were mounted in a steel housing. The polymer solution was stirred into 500 dm³ of acetone by means of a disperser (Ultraturrax) and thereby precipitated. The suspension was circulated over a 680 dm³ stirred pressure suction filter with the bottom valve open. After the bottom valve had been closed, the residue was washed three times with 200 dm³ of acetone. After the last washing, the product was predried in a stream of nitrogen at 60° C. and dried in a drying cabinet for 24 hours under 0.2 bar and at 80° C. 5.37 kg of polymer were obtained. The viscosity number was 51 ml/g and the glass transition temperature was 105° C.

Examples 2 to 9

Various cycloolefin copolymers were prepared analogously to Example 1 from norbornene or tetracyclododecene and ethylene using various metallocenes and by varying the reaction conditions (Table 1.1). The properties of the products are shown in Table 1.2. In each case 900 ml of hydrogen were initially introduced into the reaction vessel in Examples 4 and 5 for molecular weight regulation. The hydrogen used was replaced by topping up (700 ml/h in Example 4 and 800 ml/h in Example 5).

Measurements

Example 10

The following tables summarize the notched impact strengths of pure COC and COC-core/shell particle polymer alloys:

TABLE 10.1

| Notched impact strengths in kJ/m² of pure COC | |
|---|---|
| COC 1 | 2.1 |
| COC 2 | 1.8 |
| COC 3 | 1.9 |
| COC 4 | 2.0 |
| COC 5 | 2.0 |
| COC 6 | 2.1 |

TABLE 10.2

| | Notched impact strengths in kJ/m² of COC-core/shell particle alloy | | |
|---|---|---|---|
| COC | Core/shell particles | % by weight of core/shell particles | Notched impact strength |
| COC 1 / | EXL 2600 | 20 | 2.9 |
| COC 1 / | EXL 3647 | 20 | 3.3 |

TABLE 1.1

| Example No. | Polymer | Catalyst Type | Amount/mg | MAO/ml | TiBA/ml | Nb/kg | Solvent | Amount/l | Temp./° C. | Ethylene/bar | Time/min | Yield/kg |
|---|---|---|---|---|---|---|---|---|---|---|---|---|
| 1 | COC 2 | K 2 | 20 | 500 | 300 | 12.5 | toluene | 15 | 70 | 18 | 90 | 5.37 |
| 2 | COC 3 | K 2 | 37 | 1000 | — | 17.8 | toluene | 10.7 | 80 | 20 | 120 | 8.73 |
| 3 | COC 4 | K 2 | 37 | 250 | 150 | 26.4 | — | — | 80 | 20 | 120 | 5.5 |
| 4 | COC 5 | K 3 | 350 | 850 | — | 14.5 | Exxsol | 40 | 70 | 2.6 | 70 | 5.6 |
| 5 | COC 6 | K 4 | 1000 | 1500 | — | 10.7 | toluene | 40 | 70 | 2.5 | 50 | 4.95 |
| 6 | COC 7 | K 4 | 1000 | 750 | — | 10.7 | Exxsol | 40 | 70 | 2.5 | 150 | 4.28 |
| 7 | COC 8 | K 3 | 300 | 800 | — | 10.7 | Exxsol | 30 | 70 | 3.4 | 16 | 2.13 |
| 8 | COC 10 | K 2 | 37 | 500 | 600 | 19.5 | toluene | 8.3 | 90 | 20 | 50 | 7.26 |
| 9 | COC 11 | K 2 | 60 | 500 | 600 | 41.8 | — | — | 80 | 19 | 240 | 6.28 |

TABLE 1.2

| Polymer | Catalyst | Glass transition temperature (° C.) | Viscosity number ml/g | Monomers |
|---|---|---|---|---|
| COC 1 | K1 | 150 | 60 | DMON, Et |
| COC 2 | K2 | 105 | 51 | Nb, Et |
| COC 3 | K2 | 120 | 52 | Nb, Et |
| COC 4 | K2 | 145 | 67 | Nb, Et |
| COC 5 | K3 | 159 | 70 | Nb, Et |
| COC 6 | K4 | 135 | 65 | Nb, Et |
| COC 7 | K4 | 150 | 110 | Nb, Et |
| COC 8 | K3 | 150 | 135 | Nb, Et |
| COC 9 | K1 | 150 | 75 | DMON, Et |
| COC 10 | K2 | 131 | 58 | Nb, Et |
| COC 11 | K2 | 135 | 61 | Nb, Et |

K1: VOCl₂ (OC₂H₅)
K2: isopropylene(1-indenyl)cyclopentadienylzirconium dichloride
K3: diphenylmethylene(1-fluorenyl)cyclopentadienyl-zirconium dichloride
K4: dimethylsilylbis(1-indenyl)zirconium dichloride
DMON: tetracyclododecene
Nb: norbornene
Et: ethylene TABLE 10.2-continued

| | Notched impact strengths in kJ/m² of COC-core/shell particle alloy | | |
|---|---|---|---|
| COC | Core/shell particles | % by weight of core/shell particles | Notched impact strength |
| COC 2 / | EXL 3647 | 15 | 6.5 |
| COC 2 / | EXL 3647 | 20 | 8.1 |
| COC 2 / | EXL 3647 | 25 | 8.1 |
| COC 2 / | EXL 2600 | 20 | 4.9 |
| COC 3 / | EXL 3647 | 20 | 6.9 |
| COC 4 / | EXL 3647 | 20 | 4.1 |

Example 11

The following tables summarize the tensile stress/elongation properties of pure COC and COC-core/shell particle polymer alloys.

TABLE 11.1

Tensile stress/elongation properties of pure COC

| COC | Modulus (GPa) | Elongation at break (%) | Tensile strength (MPa) |
|---|---|---|---|
| COC 1 | 3.02 | 3.1 | 58 |
| COC 2 | 3.13 | 2.6 | 60 |
| COC 3 | 3.15 | 2.7 | 61 |
| COC 4 | 3.18 | 2.7 | 64 |
| COC 5 | 3.43 | 2.5 | 40 |
| COC 6 | 3.16 | 3.1 | 63 |
| COC 10 | 3.05 | 2.7 | 63 |

TABLE 11.2

Tensile stress/elongation properties of COC-core/shell particle polymer alloys

| COC | Core/shell particles | % by weight of core/shell particles | Modulus (GPa) | Elongation at break (%) | Tensile strength (MPa) |
|---|---|---|---|---|---|
| COC 1 | EXL 2600 | 20 | 2.14 | 5.4 | 47 |
| COC 1 | EXL 3647 | 20 | 2.19 | 4.5 | 47 |
| COC 2 | EXL 3647 | 15 | 2.30 | 14.0 | 44 |
| COC 2 | EXL 3647 | 20 | 2.09 | 11.3 | 41 |
| COC 2 | EXL 3647 | 25 | 1.85 | 23.0 | 35 |
| COC 2 | EXL 2600 | 20 | 2.05 | 12.0 | 42 |
| COC 3 | EXL 3647 | 20 | 2.17 | 10.5 | 42 |
| COC 4 | EXL 3647 | 20 | 2.35 | 7.0 | 29 |
| COC 5 | EXL 3647 | 20 | 2.54 | 3.0 | 38 |
| COC 10 | EXL 2600 | 10 | 2.58 | 7.6 | 55 |
| COC 10 | EXL 2600 | 20 | 2.16 | 10.1 | 45 |
| COC 11 | B 852 | 20 | 2.10 | 25.0 | 41 |

Example 12

The total light transmission for white light was determined by means of an Ulbricht globe on injection-molded sheets 2 mm thick. The following values were found.

TABLE 12

Total light transmission in %

| COC | Core/shell modifier (20% by weight) | Total light transmission in % | Clouding in % |
|---|---|---|---|
| COC 3 | EXL 3647 | 81 | 74 |
| COC 4 | EXL 3647 | 77 | 73 |
| COC 11 | B 582 | 99 | 22 |

Example 13

Using injection-molded sheets, melt viscosities were determined as a function of the measurement frequency w, the temperature T and the time t of exposure to heat. The following table shows that the polymer alloys according to the invention have a good melt stability.

TABLE 13.1

Melt viscosities of an alloy of 80% of COC 4 and 20% of EXL 3647

| t/min | w = 10/s | w = 100/s | w = 460/s |
|---|---|---|---|
| | T = 260° C. | | |
| 5 | 3750 | 1186 | 448 |
| 15 | 3793 | 1190 | 448 |
| 30 | 3876 | 1199 | 449 |
| | T = 300° C. | | |
| 5 | 1412 | 474 | 213 |
| 15 | 1511 | 482 | 214 |
| 30 | 1634 | 499 | 222 |

Example 14

TABLE 14

Bending properties of COC-core/shell particle polymer alloys

| COC | Core/shell particles (20% by weight) | E modulus (MPa) | Flexural strength (MPa) | Breaking stress (MPa) |
|---|---|---|---|---|
| COC 1 | EXL 3647 | 2216 | 69.1 | no fracture |
| COC 1 | EXL 2600 | 2117 | 71.3 | no fracture |
| COC 2 | EXL 2600 | 2014 | 60.8 | no fracture |
| COC 2 | EXL 3647 | 2074 | 67.6 | no fracture |
| COC 3 | EXL 3647 | 2121 | 69.3 | no fracture |
| COC 4 | EXL 3647 | 2349 | 83.2 | no fracture |
| COC 5 | EXL 3647 | 2518 | 75.1 | |
| COC 11 | B 582 | 2155 | 79.4 | no fracture |

Example 15

The particle sizes d required to give optimum impact strengths of COC were calculated from entanglement densities ne according to the following formula (S. Wu Polymer International 29 (1992) 229–247):

$\log(d) = 1.19 - 14.1\, n_e$, d in micrometers, ne in mmol/cm$^3$

Entanglement densities ne were calculated as follows, where R is the gas constant, T the measurement temperature of 480K and $G_N^0$ is the plateau modulus: $n_e = G_N^0/RT$.

Plateau moduli $G_N^0$ were determined by the method described by S. Wu and R. Beckerbauer (in this context, cf. Polymer 33 (1992) 509; J.Polym.Sci.Phys.Edn. 27 (1989) 723; Polym.Eng.Sci 28 (1988) 538). For this, linearly viscoelastic dynamic modulus spectra were measured as a function of the frequency at 480 K (using an RDS rheometer from Rheometrics, Piscataway, N.J., USA). According to S. Wu and R. Beckerbauer, the plateau modulus is the storage modulus G' at which tanδ assumes a minimum: $G_N^0 = (G')_{tan\delta-minimum}$, where tanδ = G"/G'.

TABLE 15

| COC | $G_N^0$ (10$^5$ Pa) | ne (mmol/cm$^3$) | d (micrometers) |
|---|---|---|---|
| COC 7 | 2.9 | 0.083 | 1.05 |
| COC 8 | 1.8 | 0.051 | 2.96 |
| COC 9 | 2.3 | 0.065 | 1.88 |

Example 16

Granules were prepared as described above by extrusion of the composition of 80% by weight of COC 4 and 20% by weight of Paraloid EXL 2600. These granules were dried as described above and extruded to films having a thickness of 20 micrometers and a width of 10 cm. Strips were cut out of the films parallel and perpendicular to the extrusion direction. These strips showed the following mechanical properties.

TABLE 16

| Modulus (GPa) | Elongation at break (%) | Tensile strength (MPa) | Pulling direction |
|---|---|---|---|
| 2.03 | 22.0 | 45 | parallel to the extrusion direction |
| 1.77 | 16.5 | 43 | perpendicular to the extrusion direction |

Example 17

The following polymers were mixed in a Haake extruder in a weight ratio of 50 to 50: COC2/PMMA, COC5/PMMA, COC9/PMMA, COC2/polystyrene, COC5/polystyrene, COC9/polystyrene, COC2/polycarbonate, COC5/polycarbonate, COC9/polycarbonate. In all cases, the unchanged glass transition temperatures of the two components were found by means of DSC measurements (Perkin Elmer DSC-7, Überkingen, Germany).

We claim:

1. A polymer alloy comprising (a) a cycloolefin copolymer component, and, dispersed in said cyclolefin copolymer component or components, (b) one or more particulate core/shell components, the core/shell particles of said core/shell component or components having a diameter of 0.01 to 0.7 micrometer;

said cycolefin copolymer or components consisting essentially of at least one cycloolefin copolymer comprising structural units obtained by copolymerization of two or more of the following olefins in the indicated amounts: 0.1–99% by weight, based on the weight of the cycloolefin copolymer, of at least one of the following polycyclic olefins of the formulas I, II, III, IV, V or VI,

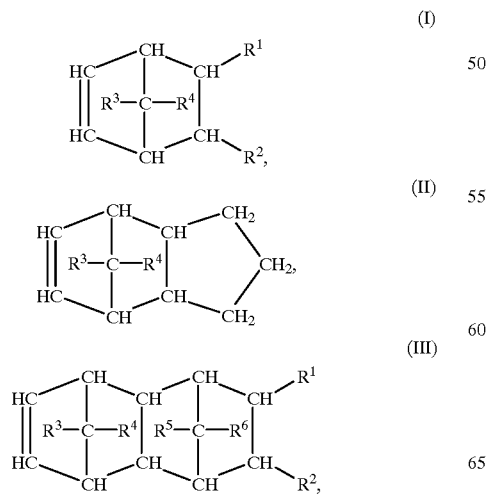

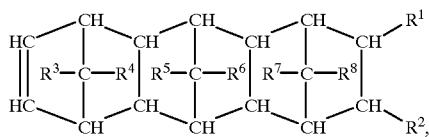

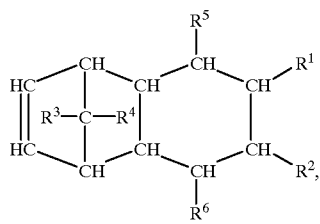

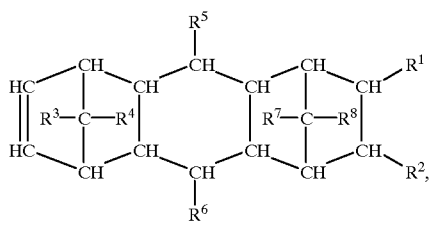

in which $R^1$, $R^2$, $R^3$, $R^4$, $R^5$, $R^6$, $R^7$ and $R^8$ are identical or different and are a hydrogen atom or a $C_1$–$C_{20}$ hydrocarbon radical, or two or more of the radicals $R^1$ through $R^8$ form a ring, if sterically positioned to be able to form a ring, and the radicals $R^1$ to $R^8$ in the formulae I to VI can have a different meaning, 0 to 95% by weight, based on the total weight of the cyclolefin copolymer, of at least one monocyclic olefin of the formula VII

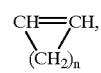

in which n is a number from 2 to 10, and
0 to 99% by weight, based on the total weight of the cycloolefin polymer, of one or more acyclic olefins of the formulae VIII

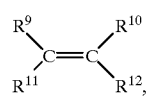

in which $R^9$, $R^{10}$, $R^{11}$ and $R^{12}$ are identical or different and are a hydrogen atom or a $C_1$–$C_{20}$ hydrocarbon radical; and said particulate core/shell component consisting essentially of:
one or more rubber phases and one or more hard phases, the hard phase or phases having a glass transition temperature above 50° C. and the rubber phase or phases having a lower glass transition temperature than said hard phase or phases, said rubber and hard phases consisting essentially of polymerized unsaturated compounds having carbon-carbon bonds in the polymer backbone.

2. A polymer alloy as claimed in claim 1, wherein said alloy comprises 2 to 50% by weight of said particulate core/shell component, essentially the balance of said polymer alloy being said cycloolefin copolymer component.

3. A polymer alloy as claimed in claim 1, wherein, in said particulate core/shell component, said rubber phase comprises 10 to 90% by volume of said component, based on the total volume of particles in said component, and said hard phase comprises 90 to 10% by volume of said component, on the same basis.

4. A polymer alloy as claimed in claim 1 wherein said rubber phase has a glass transition temperature below 0° C., and said hard phase has a glass transition temperature above 80° C.

5. A polymer alloy as claimed in claim 1, wherein said polymer alloy further comprises: a plasticizing agent, a UV stabilizer, an optical brightener, an antioxidant, an antistatic agent, a heat stabilizer, a reinforcing additive, or a filler.

6. A polymer alloy comprising: (a) a cycloolefin copolymer component comprising a copolymer of the reactants comprising norbornene or tetracyclododecene and an acyclic olefin, and dispersed in said cycloolefin copolymer component, (b) 2 to 50% by weight, based on the total alloy, of a particulate core/shell component comprising at least one rubbery phase having a glass transition temperature below 0° C. and a hard phase having a glass transition temperature above 50° C.; the rubbery phase consisting essentially of, or, if more than one rubbery phase is present in said alloy, each said rubbery phase consisting essentially of one or more polymerized unsaturated compounds.

7. A polymer alloy as claimed in claim 1, wherein:
said particulate core/shell components have an average refractive index, determined as the volume mean, of 1.52 to 1.55.

8. A method for the preparation of the polymer alloy of claim 1, comprising the step of mixing together said cycloolefin copolymer component and said particulate core/shell component.

9. A method for the preparation of the polymer alloy of claim 1, comprising the steps of:
(a) preparing an alloy by mixing said cycloolefin copolymer component and said particulate core/shell component, and
(b) mixing the resulting masterbatch with additional cycloolefin copolymer.

10. A method for making a shaped article, comprising the step of shaping a polymer alloy of claim 1 to obtain the desired shaped article.

11. A shaped article comprising a polymer alloy of claim 1.

12. A polymer alloy as claimed in claim 3, wherein said rubber phase has a glass transition temperature below 0° C., and said hard phase has a glass transition temperature above 80° C. and said particulate core/shell components have an average refractive index, determined as the volume mean, of 1.52 to 1.55 and said particulate core/shell components have a diameter of 0.02 to 0.4 micrometer.

13. A polymer alloy as claimed in claim 12 wherein said rubber phase has a glass transition temperature below 0° C., and said hard phase has a glass transition temperature above 100° C. and said particulate core/shell components have an average refractive index, determined as the volume mean, of 1.53 to 1.54 and said particulate core/shell components have a diameter of 0.05 to 0.3 micrometer.

14. A polymer alloy as claimed in claim 13, wherein, in said particulate core/shell component, said rubber phase comprises 30 to 60% by volume of said component, based on the total volume of particles in said component, and said hard phase comprises 70 to 40% by volume of said component, on the same basis.

15. A polymer alloy as claimed in claim 6, wherein said hard phase has a glass transition temperature above 80° C. and said particulate core/shell components have an average refractive index, determined as the volume mean, of 1.52 to 1.55.

16. A polymer alloy as claimed in claim 15, wherein said rubber phase has a glass transition temperature below 0° C., and said hard phase has a glass transition temperature above 100° C. and said particulate core/shell components have an average refractive index, determined as the volume mean, of 1.53 to 1.54 and said particulate core/shell components have a diameter of 0.05 to 0.3 micrometer.

17. The polymer alloy as claimed in claim 1, wherein the alloy consists of (a) a cycloolefin copolymer component, and, dispersed in said cycloolefin copolymer component or components, (b) one or more particulate core/shell components, the core/shell particles of said core/shell component or components having a diameter of 0.01 to 0.7 micrometer;

said cyclolefin copolymer component or components consisting of at least one cycloolefin copolymer consisting of structural units obtained by copolymerization of two or more of the following olefins in the indicated amounts:
0.1–99% by weight, based on the weight of the cycloolefin copolymer, of at least one of the following polycyclic olefins of the formulas I, II, III, IV, V or VI,
0 to 95% by weight, based on the total weight of the cyclolefin copolymer, of at least one monocyclic olefin of the formula VII and
0 to 99% by weight, based on the total weight of the cycloolefin polymer, of one or more acyclic olefins of the formulae VIII and said particulate core/shell component consisting of: one or more rubber phases and one or more hard phases, the hard phase or phases having a glass transition temperature above 50° C. and the rubber phase or phases having a lower glass transition temperature than said hard phase or phases, said rubber and hard phases consisting of polymerized unsaturated compounds having carbon-carbon bonds in the polymer backbone.

18. A polymer alloy as claimed in claim 17, wherein said alloy consists of 2 to 50% by weight of said particulate core/shell component, essentially the balance of said polymer alloy being said cycloolefin copolymer component.

19. A polymer alloy as claimed in claim 1, wherein, in said particulate core/shell component, said rubber phase consists of 10 to 90% by volume of said component, based on the total volume of particles in said component, and said hard phase comprises 90 to 10% by volume of said component, on the same basis and said rubber phase has a glass transition temperature below 0° C., and said hard phase has a glass transition temperature above and said particulate core/shell components have an average refractive index, determined as the volume mean, of 1.52 to 1.55.

20. The method as claimed in claim 8, which consists essentially of the step of mixing together said cycloolefin copolymer component and said particulate core/shell component.

* * * * *